US008457630B2

(12) United States Patent
Madej et al.

(10) Patent No.: US 8,457,630 B2
(45) Date of Patent: Jun. 4, 2013

(54) SYSTEM AND METHOD FOR TRANSFERRING A DEVICE BETWEEN MOBILE CARRIERS

(75) Inventors: Piotr Madej, Mississauga (CA); Jia-Lin Chin, Scarborough (CA); Diana G. Vitorino, Toronto (CA); Levente Janosi, Stony Creek (CA)

(73) Assignee: Research In Motion Limited, Waterloo (CA)

( * ) Notice: Subject to any disclaimer, the term of this patent is extended or adjusted under 35 U.S.C. 154(b) by 623 days.

(21) Appl. No.: 11/467,352

(22) Filed: Aug. 25, 2006

(65) Prior Publication Data
US 2008/0051083 A1 Feb. 28, 2008

(51) Int. Cl.
*H04M 11/00* (2006.01)
(52) U.S. Cl.
USPC ......... 455/435.1; 455/406; 455/410; 455/418
(58) Field of Classification Search
USPC ............... 455/411, 406, 409, 410, 418, 435.1
See application file for complete search history.

(56) References Cited

U.S. PATENT DOCUMENTS

| | | | | |
|---|---|---|---|---|
| 5,148,472 A * | 9/1992 | Freese et al. | ................... | 455/408 |
| 6,026,291 A * | 2/2000 | Carlsson et al. | ............... | 455/406 |
| 6,148,197 A * | 11/2000 | Bridges et al. | ............. | 455/432.3 |
| 6,192,242 B1 * | 2/2001 | Rollender | ..................... | 455/433 |
| 6,366,663 B1 * | 4/2002 | Bauer et al. | .............. | 379/221.13 |
| 6,381,456 B1 | 4/2002 | Ko | | |
| 6,519,470 B1 * | 2/2003 | Rydbeck | ........................ | 455/466 |
| 6,961,567 B1 * | 11/2005 | Kuhn | .......................... | 455/435.1 |
| 7,155,206 B2 * | 12/2006 | Allison et al. | ................. | 455/406 |
| 7,236,780 B2 * | 6/2007 | Benco et al. | ............... | 455/432.1 |
| 7,536,184 B2 * | 5/2009 | Poczo | ......................... | 455/432.3 |
| 2004/0139204 A1 | 7/2004 | Ergezinger et al. | | |
| 2004/0162058 A1 * | 8/2004 | Mottes | .......................... | 455/411 |
| 2004/0219904 A1 * | 11/2004 | De Petris | ...................... | 455/410 |
| 2004/0242209 A1 * | 12/2004 | Kruis et al. | ................. | 455/414.1 |
| 2005/0153741 A1 * | 7/2005 | Chen et al. | ..................... | 455/558 |
| 2006/0009214 A1 * | 1/2006 | Cardina et al. | ............. | 455/432.3 |
| 2006/0009218 A1 * | 1/2006 | Moss | .......................... | 455/435.1 |
| 2006/0160543 A1 * | 7/2006 | Mashinsky | ................. | 455/452.2 |
| 2006/0252409 A1 * | 11/2006 | Brenchley et al. | ............ | 455/405 |

(Continued)

FOREIGN PATENT DOCUMENTS

| | | |
|---|---|---|
| WO | 97/38522 A | 10/1997 |
| WO | 98/46002 A | 10/1998 |
| WO | 03/092317 A | 3/2003 |
| WO | 2006/034284 A | 3/2006 |

*Primary Examiner* — Steven Kelley
(74) *Attorney, Agent, or Firm* — Perry + Currier Inc.; Kristjan Spence

(57) ABSTRACT

There is disclosed a system and method for transferring a mobile handheld device between mobile carriers. In an embodiment, a system for transferring a handheld device between mobile carriers comprises a provisioning system for receiving from a first mobile carrier a request to register the device on the first mobile carrier's wireless network; a database uniquely identifying the device to determine if the device has been previously registered; deactivation means for deactivating the device from the second mobile carrier's wireless network if the device has been previously registered to a second mobile carrier; and registration means for registering the device on the first mobile carrier's wireless network upon confirmation that the device has been deactivated from the second mobile carrier's wireless network. The device may be uniquely identified by a unique electronic serial number (ESN) or a unique product identification number (PIN).

15 Claims, 4 Drawing Sheets

U.S. PATENT DOCUMENTS

| | | | |
|---|---|---|---|
| 2006/0276171 A1* | 12/2006 | Pousti | 455/405 |
| 2006/0281443 A1* | 12/2006 | Chen et al. | 455/413 |
| 2007/0123219 A1* | 5/2007 | Lovell, Jr. | 455/412.1 |
| 2008/0046357 A1* | 2/2008 | Myers et al. | 705/39 |
| 2008/0051069 A1* | 2/2008 | Chin | 455/414.1 |
| 2008/0071629 A1* | 3/2008 | Benson et al. | 705/26 |

* cited by examiner

SYSTEM AND METHOD FOR TRANSFERRING A DEVICE BETWEEN MOBILE CARRIERS

FIELD OF THE INVENTION

The present invention relates generally to systems and methods for transferring a device between mobile carriers.

BACKGROUND

Suppliers of mobile communication services, such as wireless email, may offer handheld devices that may be used on the networks of multiple mobile carriers. Where there are two mobile carriers A and B with compatible network standards and protocols, the handheld device may be capable of operating on the wireless networks of both mobile carriers A and B. If mobile carrier A and mobile carrier B are related companies, they may allow the handheld devices to be transferred between their networks.

Suppose that a user purchases and registers a handheld device and becomes a subscriber on mobile carrier A's wireless network. In some cases, a handheld device may be returned and made available to another user who may become a subscriber on mobile carrier B's wireless network. This may result in the supplier billing both mobile carriers A and B for the same device. What is needed is an improved system and method for transferring devices between mobile carriers that may avoid this problem.

BRIEF DESCRIPTION OF THE DRAWINGS

In the figures which illustrate exemplary embodiments of the invention.

DETAILED DESCRIPTION

As noted above, the present invention relates to a system and method for transferring devices between mobile carriers.

Figure 1:
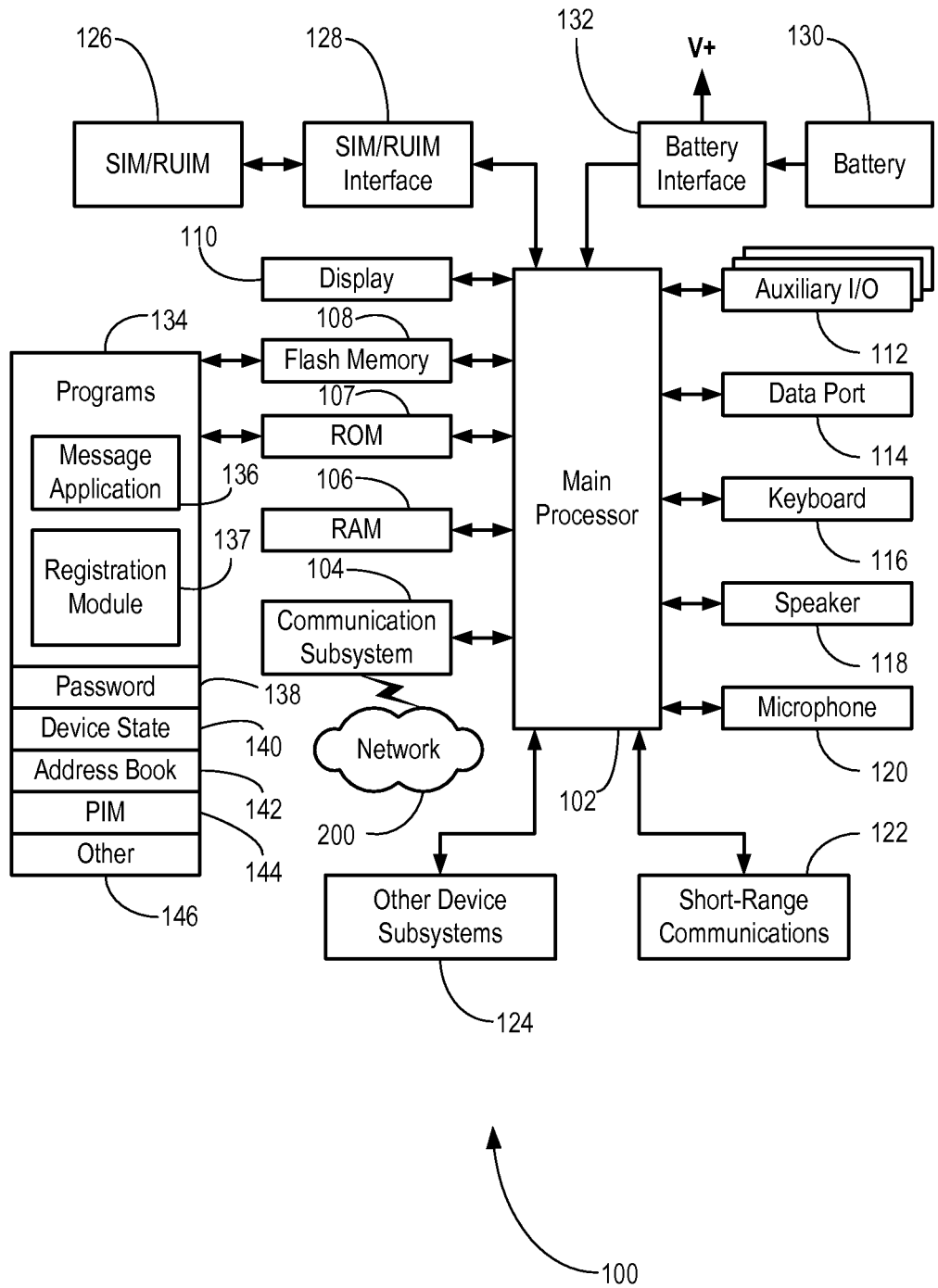
FIG. 1 is an illustration of a device in accordance with an embodiment.

Shown in FIG. 1 is a schematic block diagram of an illustrative mobile handheld device 100. The handheld device 100 may comprise a number of components, including a main processor 102 which controls the overall operation of device 100. Communication functions, including data and voice communications, may be performed through a communication subsystem 104. The communication subsystem 104 may receive messages from and sends messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a speaker 118, a microphone 120, short-range communications 122 and other device subsystems 124. The device 100 may be a battery-powered device and may include a battery interface 132 for receiving one or more rechargeable batteries 130 and for powering the various subsystems described above.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

Handheld device 100 may also include a read-only memory (ROM) 107 that may store a non-alterable electronic serial number or ESN which may be burned into ROM 107 at the time of manufacture of device 100. In addition, handheld device 100 may have a unique product identification number (PIN) stored in the ROM 107, or in another memory store in device 100.

The main processor 102, in addition to its operating system functions, enables execution of software applications 134 on the device 100. The subset of software applications 134 that control basic device operations, including data and voice communication applications, will normally be installed on the device 100 during its manufacture.

The software applications 134 may include, for example, a messaging application 136, and a password approval module 138. The software applications 134 may also include a device registration module 137 for registering the device 100 on a carrier network. As will be described further below, the registration of device 100 may be performed such that the double-billing problem as described above may be avoided.

The handheld device 100 may further include a device state module 140, an address book 142, a personal information manager (PIM) 144, and various other modules 146. Additional applications may also be loaded onto the device 100 through one of the wireless network 200, the auxiliary I/O subsystem 112, the data port 114, the short-range communications subsystem 122, or another subsystem 124.

Figure 2:
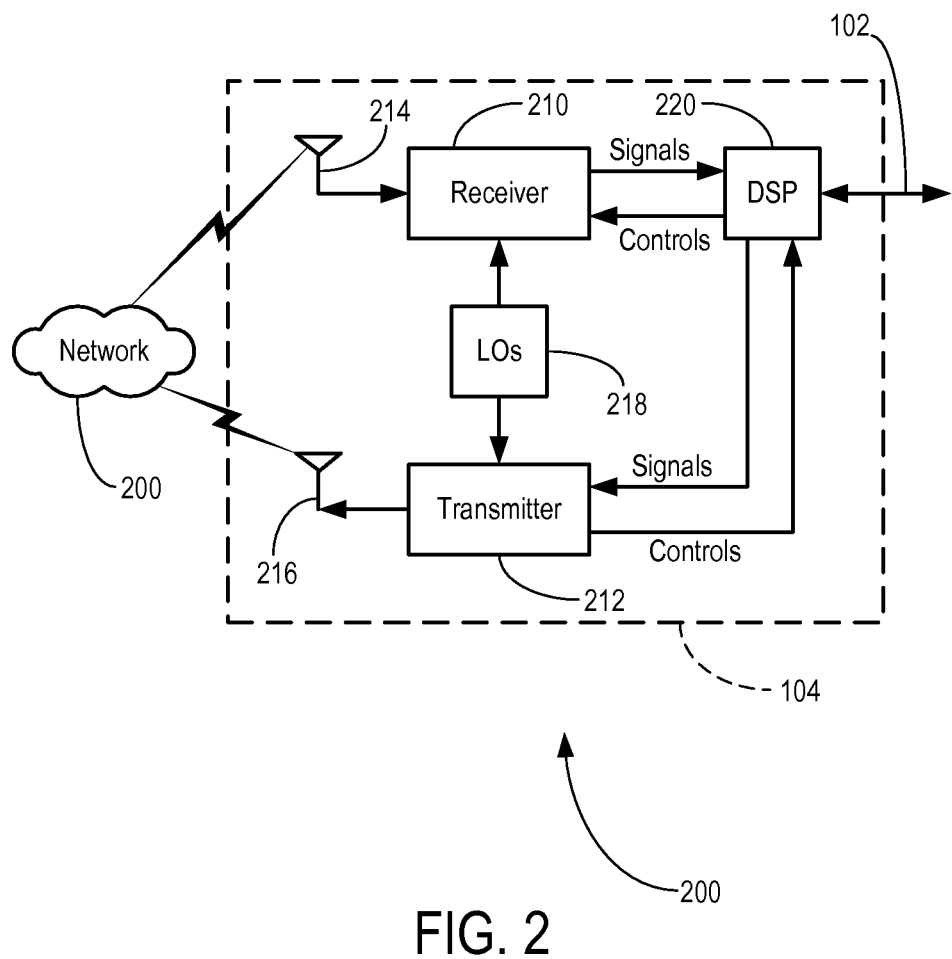
FIG. 2 is a schematic block diagram of a communication subsystem component in the device of FIG. 1.

Referring now to FIG. 2, a block diagram of the communication subsystem component 104 of FIG. 1 is shown. The communication subsystem 104 may comprise a receiver 210 and a transmitter 212, as well as associated components such as one or more embedded or internal antenna elements 214, 216, Local Oscillators (LOs) 218, and a processing module such as a Digital Signal Processor (DSP) 220.

Signals received by the antenna 214 through the wireless network 200 are input to the receiver 210, which can perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 220. In a similar manner, signals to be transmitted are processed, including modulation and encoding, by the DSP 220. These DSP-processed signals are input to the transmitter 212 for digital-to-analog (D/A) conversion, frequency up conversion, filtering, amplification and transmission over the wireless network 200 via the antenna 216.

Figure 3:
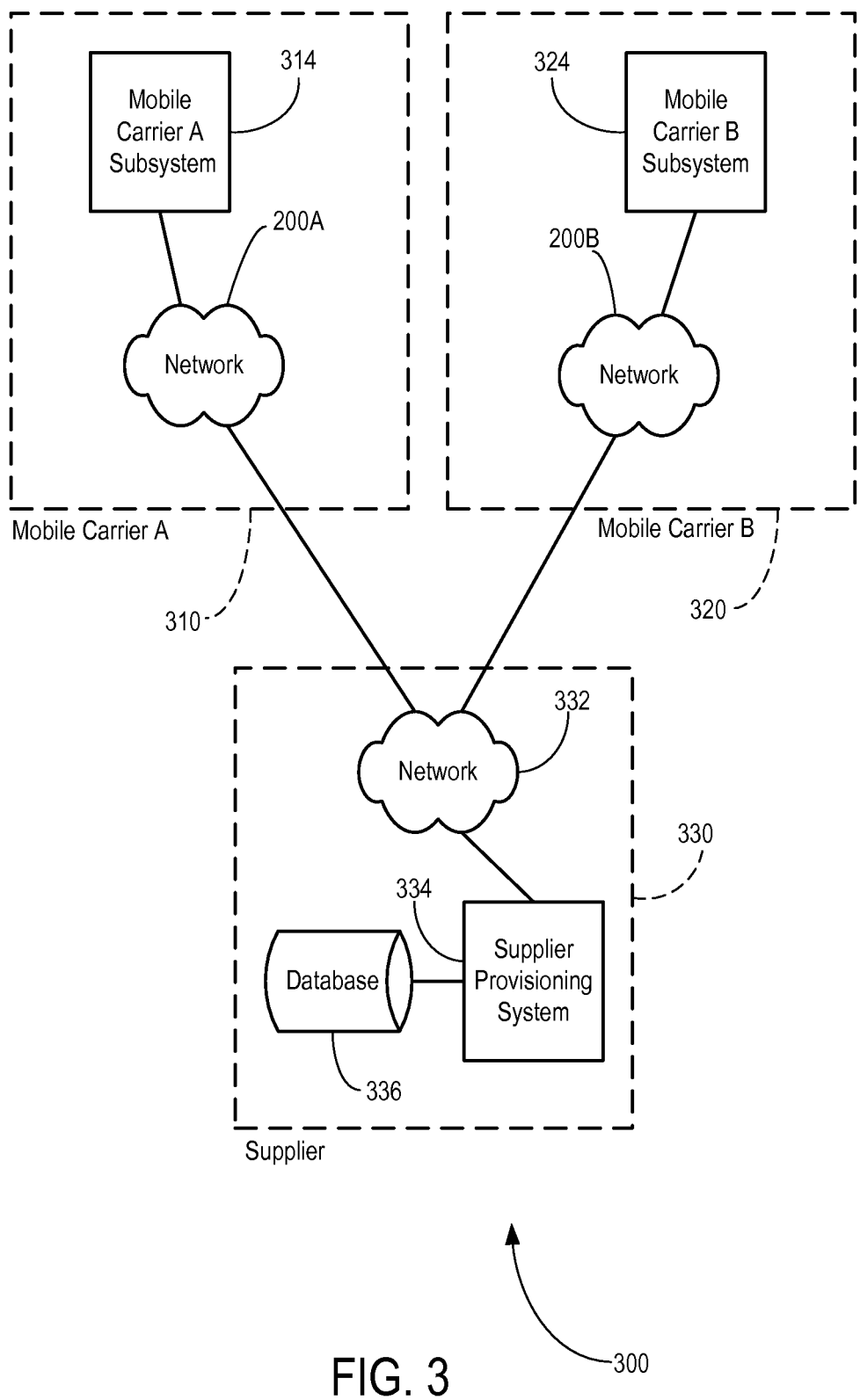
FIG. 3 is a schematic block diagram of a system in accordance with an embodiment.

Now referring to FIG. 3, shown is an illustrative schematic block diagram of wireless networks 200A, 200B of mobile carrier A 310 and mobile carrier B 320, respectively. With the various components and subsystems described above, device 100 may be configured to access wireless networks 200A and 200B. As shown, each of the wireless networks 200A, 200B may have subsystems 314, 324 for requesting registration of devices 100 onto their respective wireless networks 310, 320.

Still referring to FIG. 3, a supplier 330 of wireless communication services may offer, for example, wireless email services to subscribers on both wireless networks 200A, 200B via network connections to the supplier 330's own network 332. The supplier 330's network 332 may connect to a provisioning system 334 maintained by the supplier 330 and which may be appropriately configured to interact with subsystems 314, 324 provided on each of the wireless networks 200A, 200B. Provisioning system 334 may maintain a database 336 of devices 100 that have been provisioned on the wireless networks 200A, 200B of mobile carrier A 310, and mobile carrier B 320.

In the database 336 of provisioning system 334, each of the devices 100 may be uniquely identified, for example, by the unique ESN burned into the ROM 107 of each device 100. Alternatively, each device 100 may be uniquely identified by the unique PIN identifier stored in ROM 107, or in another memory store in device 100. Records in database 336 may contain the unique ESN or PIN retrieved from ROM 107 or another memory store on each device 100. Each device 100 may thus be uniquely recognized by the supplier's provisioning system 334. Records in database 336 may also store information for the owning mobile carrier (e.g. mobile carrier A 310, or mobile carrier B 320), and this information may be linked to the unique ESN or PIN of device 100.

In an embodiment, each of the devices 100 may also have a unique billing identification (BID) based on the ESN or PIN. This information may also be stored in the database 336 of provisioning system 334. The database 336 of provisioning system 334 may also store for each device 100 information on various wireless communication services that have been provisioned for that device (e.g. voice, data, picture, text messaging, Internet access, music downloading, etc.). Use of the various services can be monitored by a subscriber's unique BID, and billed appropriately to the subscriber.

In an embodiment, registration module 137 of device 100 may be configured such that, when the device 100 is first powered up by a new user, the device 100 seeks a wireless network connection to access the supplier's provisioning system 334. Subsystems 314, 324 on the wireless networks 200A, 200B may facilitate this connection between device 100 and provisioning system 334.

In the scenario described earlier, where a device 100 is originally registered to carrier A 310's wireless network 200A, then is transferred to carrier B 320's wireless network 320, a double-billing problem may occur if device 100 is still activated on mobile carrier A 310's wireless network 200A. Even if carrier A 310 subsequently detects that device 100 has been registered on carrier B 320's wireless network 200B, carrier A 310 may be prevented by regulatory and security restrictions from attempting to deactivate device 100, as the device is now being used by carrier B 320's subscriber. In order to avoid this above problem, the following is proposed.

In an embodiment, the request to provision the device 100 is received by provisioning system 334 (via subsystems 314, 324) only when the device 100 is turned on and at least temporarily makes a connection to the wireless network of the requesting mobile carrier. This is so that the ESN or PIN of the device 100 from which the request is made may be retrieved.

In the current example, suppose the request to provision the services is received from mobile carrier B 320. Rather than fulfilling the request to provision services for device 100 immediately, provisioning system 334 may be configured to first query its database 336 to determine whether the device 100 has been previously registered. As noted above, the unique ESN or PIN stored in ROM 107, or in another memory store in device 100, may be used to uniquely identify the device 100 for the purposes of this query.

In an embodiment, in order to maintain security, mobile carrier B 320 is prevented from conducting a status request on device 100 directly from mobile carrier A 310, and vice versa. Rather, the supplier 330 handles any transfer of the device 100 between mobile carrier A 310 and mobile carrier B 320 on their behalf.

In the current example, upon receiving the registration request from mobile carrier B, provisioning system 334 may determine if there is a record of device 100 in its provisioning system 334. As noted, the ESN or PIN may be used to uniquely identify device 100. If device 100 has not been previously registered, then provisioning system 334 may proceed to allow registration of device 100 on mobile carrier B 320's wireless network 200B, and provision mobile communication services for the device 100.

On the other hand, if provisioning system 334 determines that device 100 has been previously registered (e.g. there is a record in database 336 of device 100 being registered on wireless network 200A of mobile carrier A 310), provisioning system 334 may be configured to determine whether the previous mobile carrier (i.e. mobile carrier A 310) uses a device based BID (e.g. BID based on ESN or PIN) and the device 100 is still activated on wireless network 200A. If the provisioning system 100 determines that device 100 is still activated on the wireless network 200A of mobile carrier A 310, then provisioning system 334 may proceed to deactivate device 100 on wireless network 200A. A notice may be sent to mobile carrier A 310 to advise that device 100 has been deactivate on its network. If there are any billing contracts set up for device 100 on wireless network 200A, such billing contracts may also be cancelled by the provisioning system 334.

In an embodiment, in order to allow the supplier 330 to verify deactivation of device 100 before allowing registration, mobile carrier B 320 will not be able to pre-activate a service for the device 100. On the other hand, if mobile carrier B 320 uses a non-device specific billing ID (e.g. Mobile Station International Subscriber Directory Number also known as MSISDN), then mobile carrier B 320 may pre-activate a subscriber with some services but still will not be able to register a device 100 that is currently active for A until that device 100 completes registration with mobile carrier B 320.

Upon confirming deactivation of device 100 on wireless network 200A, provisioning system 334 may proceed to register device 100 on wireless network 200B, and also provision the requested wireless communication services. A new billing contract based on a new BID may also be set up for device 100 on wireless network 200B.

Figure 4:
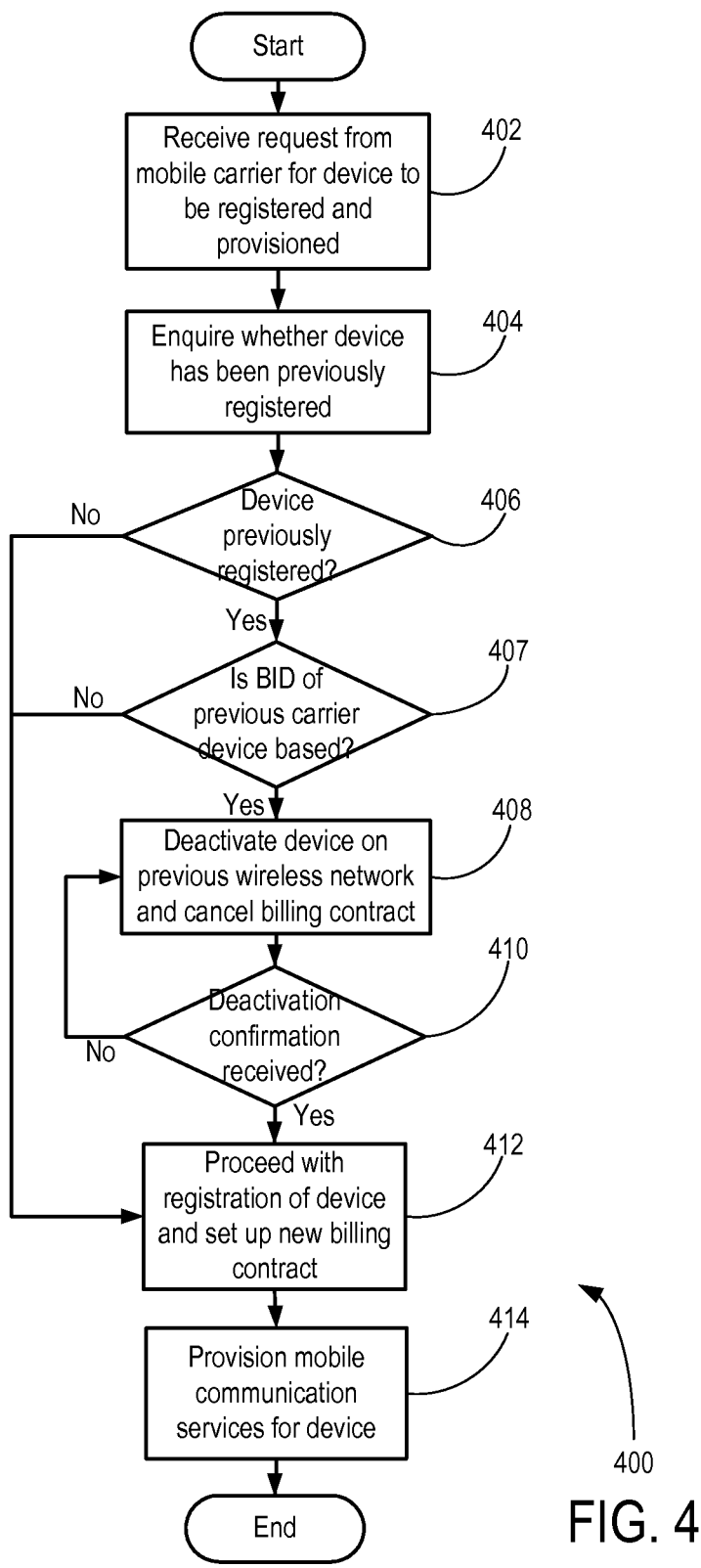
FIG. 4 is a flowchart of a method in accordance with an embodiment.

Now referring to FIG. 4, shown is an illustrative method 400 corresponding to the above described system. Method 400 begins and, at block 402, receives a request (e.g. from mobile carrier B 320) for a device (e.g. handheld device 100) to be registered (e.g. on mobile carrier B 320's wireless network 200B) and provisioned with mobile communications services. Upon receiving this request, at block 404, method 400 may proceed to make an enquiry (e.g. to provisioning system 334 and its database 336) to see whether device 100 has been previously registered and provisioned.

At decision block 406, method 400 determines if the device 100 may have been previously registered. If no, method 400 proceeds to block 412 where method 400 proceeds with registration of device 100. Method 400 then proceeds to block 414 where method 400 provisions the requested wireless communication services on the wireless network (i.e. wireless network 200B) of the requesting mobile carrier B 320. If yes, module 400 proceeds to block 407.

At block 407, method 400 determines if the BID of the previous mobile carrier (i.e. mobile carrier A 310) is device based (e.g. based on the unique ESN or unique PIN of the device 100). If no, method 400 proceeds to block 412 and proceeds with registration of device 100. If yes, method 400 proceeds to block 408.

At block 408, method 400 deactivates the device 100 on the wireless network of the previous mobile carrier (i.e. mobile carrier A 310). Any billing contract for device 100 with the previous wireless carrier may also be cancelled.

At decision block 410, method 400 determines if deactivation of the device on the previous mobile carrier has been confirmed. If no, method 400 loops. If yes, method 400 proceeds to block 412 where method 400 proceeds to allow registration of device 100. A new billing contract may also be set up for device 100 on the wireless network of the requesting mobile carrier (i.e. wireless network 200B of mobile carrier B 320).

Method 400 then proceeds to block 414, where method 400 may provision mobile communication services for the device on the requesting mobile carrier's wireless network (i.e. wireless network 200B). Method 400 then ends.

As will be appreciated, with the above system and method, the double-billing problem between mobile carriers A and B may be avoided.

Thus, in accordance with an embodiment of the invention, there is provided a method of transferring a handheld device between mobile carriers, comprising: receiving from a requesting mobile carrier a request to register the device on the requesting mobile carrier's wireless network; uniquely identifying the device and querying a database to determine if the device has been previously registered; if the device has been previously registered to a previous mobile carrier, deactivating the device from the previous mobile carrier's wireless network; and upon confirmation that the device has been deactivated from the previous mobile carrier's wireless network, registering the device on the requesting mobile carrier's wireless network.

In an embodiment, the method further comprises, upon registration of the device on the requesting mobile carrier's wireless network, provisioning requested mobile communication services for the device on the requesting mobile carrier's wireless network.

In another embodiment, the method further comprises uniquely identifying the device by one of a unique electronic serial number (ESN) and a unique product identification number (PIN).

In another embodiment, the method further comprises maintaining in the database a list of previously registered devices based on one of the unique ESN and the unique PIN.

In another embodiment, the method further comprises maintaining in the database a unique billing identification (BID) based on one of the unique ESN and the unique PIN.

In another embodiment, the method further comprises receiving the request to register the device only if the device is currently connected via the requesting mobile carrier's wireless network and can be identified by one of the unique ESN and the unique PIN.

In another embodiment, the method further comprises, upon registration of the device on the requesting mobile carrier's wireless network, updating the database with the new registration information for the device.

In another embodiment, the method further comprises deactivating the device from the previous mobile carrier's wireless network only if the previous mobile carrier uses a device based billing identification (BID).

In another aspect of the invention, there is provided a system for transferring a handheld device between mobile carriers, comprising: a provisioning system for receiving from a requesting mobile carrier a request to register the device on the requesting mobile carrier's wireless network; a database uniquely identifying the device to determine if the device has been previously registered; deactivation means for deactivating the device from the previous mobile carrier's wireless network if the device has been previously registered to a previous mobile carrier; and registration means for registering the device on the requesting mobile carrier's wireless network upon confirmation that the device has been deactivated from the previous mobile carrier's wireless network.

In an embodiment, the system further comprises provisioning means for provisioning requested mobile communication services for the device on the requesting mobile carrier's wireless network upon registration of the device on the requesting mobile carrier's wireless network.

In another embodiment, the system further comprises identification means for uniquely identifying the device by one of a unique electronic serial number (ESN) and a unique product identification number (PIN).

In another embodiment, the provisioning system maintains in the database a list of previously registered devices based on one of the unique ESN and the unique PIN.

In another embodiment, the provisioning system maintains in the database a unique billing identification (BID) based on one of the unique ESN and the unique PIN.

In another embodiment, the provisioning system is configured to receive the request to register the device only if the device is currently connected via the requesting mobile carrier's wireless network and can be identified by one of the unique ESN and the unique PIN.

In another embodiment, the database stores the new registration information for the device upon registration of the device on the requesting mobile carrier's wireless network.

In another aspect of the invention, there is provided a computer readable medium storing computer code that when loaded into a provisioning system adapts the provisioning system to transfer a handheld device between mobile carriers, the computer readable medium comprising: code for receiving from a requesting mobile carrier a request to register the device on the requesting mobile carrier's wireless network; code for uniquely identifying the device and querying a database to determine if the device has been previously registered; code for deactivating the device from the previous mobile carrier's wireless network if the device has been previously registered to a previous mobile carrier; and code for registering the device on the requesting mobile carrier's wireless network upon confirmation that the device has been deactivated from the previous mobile carrier's wireless network.

In an embodiment, the computer readable medium further comprises code for provisioning requested mobile communication services for the device on the requesting mobile carrier's wireless network upon registration of the device on the requesting mobile carrier's wireless network.

In another embodiment, the computer readable medium further comprises code for uniquely identifying the device by one of a unique electronic serial number (ESN) and a unique product identification number (PIN).

In another embodiment, the computer readable medium further comprises code for maintaining in the database a list of previously registered devices based on one of the unique ESN and the unique PIN.

In another embodiment, the computer readable medium further comprises code for maintaining in the database a unique billing identification (BID) based on one of the unique ESN and the unique PIN.

In another embodiment, the computer readable medium further comprises code for receiving the request to register the device only if the device is currently connected via the requesting mobile carrier's wireless network and can be identified by one of the unique ESN and the unique PIN.

In another embodiment, the computer readable medium further comprises code for updating the database with the new registration information for the device upon registration of the device on the requesting mobile carrier's wireless network.

In another embodiment, the computer readable medium further comprises code for deactivating the device from the previous mobile carrier's wireless network only if the previous mobile carrier uses a device based billing identification (BID).

While illustrative embodiments have been described above, it will be appreciated that various changes and modifications may be made. More generally, the scope of the invention is defined by the following claims.

What is claimed is:

1. A method of transferring a handheld device from a previous subscriber's mobile carrier to a new subscriber's requesting mobile carrier, comprising:
   receiving at a supplier provisioning system, from the requesting mobile carrier, a request to register the device on the requesting mobile carrier's wireless network;
   querying, at the supplier provisioning system, a database included in the supplier provisioning system and storing a plurality of previous registrations for a plurality of devices, the registrations comprising device identifiers, associated unique billing identifiers (BID), and associated previous carrier identifiers, to determine if the device has been previously registered to the previous subscriber's mobile carrier;
   when the device has been previously registered to the previous subscriber's mobile carrier, determining whether a previously registered BID associated with the device is based on a device identifier of the device;
   when the determination of whether a previously registered BID associated with the device is based on a device identifier is affirmative, deactivating the device from the previous subscriber's mobile carrier's wireless network;
   upon confirmation that the device has been deactivated from the previous subscriber's mobile carrier's wireless network, registering the device on the requesting mobile carrier's wireless network using a different unique BID associated with the device; and
   upon registration of the device on the requesting mobile carrier's wireless network, updating the database with the different BID.

2. The method of claim 1, further comprising, upon registration of the device on the new subscriber's requesting mobile carrier's wireless network, provisioning requested mobile communication services for the device on the new subscriber's requesting mobile carrier's wireless network.

3. The method of claim 1, wherein the different unique BID is based upon one of a unique electronic serial number (ESN) and a unique product identification number (PIN).

4. The method of claim 3, wherein the device identifiers of the plurality of previous registrations are one of the unique ESN and the unique PIN.

5. The method of claim 3, further comprising receiving the request to register the device only if the device is connected wirelessly via the new subscriber's requesting mobile carrier's wireless network and can be identified by one of the unique ESN and the unique PIN.

6. A system for transferring a handheld device from a previous subscriber's mobile carrier to a new subscriber's requesting mobile carrier, comprising:
   a supplier provisioning system, for receiving from the requesting mobile carrier, a request to register the device on the new subscriber's requesting mobile carrier's wireless network;
   the supplier provisioning system including a database storing a plurality of previous registrations for a plurality of devices, the registrations comprising device identifiers, associated unique billing identifiers (BID), and associated previous carrier identifiers, the supplier provisioning system configured to query the database to determine if the device has been previously registered to the previous subscriber's mobile carrier;
   the supplier provisioning system further configured to determine whether a previously registered BID associated with the device is based on a device identifier of the device;
   the supplier provisioning system further configured to, when the determination of whether a previously registered BID associated with the device is based on a device identifier is affirmative, deactivate the device from the previous subscriber's mobile carrier's wireless network;
   the supplier provisioning system further configured to register the device on the requesting mobile carrier's wireless network with a different unique BID associated with the device upon confirmation that the device has been deactivated from the previous subscriber's mobile carrier's wireless network; and
   the supplier provisioning system further configured, upon registration of the device on the requesting mobile carrier's wireless network, to update the database with the different BID.

7. The system of claim 6, further comprising provisioning means for provisioning requested mobile communication services for the device on the new subscriber's requesting mobile carrier's wireless network upon registration of the device on the requesting mobile carrier's wireless network.

8. The system of claim 6, wherein the different unique BID is based on one of a unique electronic serial number (ESN) and a unique product identification number (PIN).

9. The system of claim 8, wherein the device identifiers of the previous registrations are one of the unique ESN and the unique PIN.

10. The system of claim 8, wherein the provisioning system is configured to receive the request to register the device only if the device is connected wirelessly via the new subscriber's requesting mobile carrier's wireless network and can be identified by one of the unique ESN and the unique PIN.

11. A non-transitory computer readable medium storing computer code that when loaded into a provisioning system adapts the provisioning system to transfer a handheld device from a previous subscriber's mobile carrier to a new subscriber's requesting mobile carrier, the computer readable medium comprising:
   code for receiving at a supplier provisioning system, from the requesting mobile carrier, a request to register the device on the requesting mobile carrier's wireless network;
   code for querying, at the supplier provisioning system, a database included in the supplier provisioning system and storing a plurality of previous registrations for a plurality of devices, the registrations comprising device identifiers, associated unique billing identifiers (BID), and associated previous carrier identifiers, to determine if the device has been previously registered to the previous subscriber's mobile carrier;
   code for, when the device has been previously registered to the previous subscriber's mobile carrier, determining whether a previously registered BID associated with the device is based on a device identifier of the device;
   code for, when the determination of whether a previously registered BID associated with the device is based on a device identifier is affirmative, deactivating the device from the previous subscriber's mobile carrier's wireless network;

code for registering the device on the requesting mobile carrier's wireless network using a different unique BID associated with the device upon confirmation that the device has been deactivated from the previous subscriber's mobile carrier's wireless network; and code for, upon registration of the device on the requesting mobile carrier's wireless network, updating the database with the different BID.

12. The non-transitory computer readable medium of claim 11, further comprising, code for provisioning requested mobile communication services for the device on the new subscriber's requesting mobile carrier's wireless network upon registration of the device on the new subscriber's requesting mobile carrier's wireless network.

13. The non-transitory computer readable medium of claim 11, wherein the different unique BID is based upon one of a unique electronic serial number (ESN) and a unique product identification number (PIN).

14. The non-transitory computer readable medium of claim 13, wherein the device identifiers of the plurality of previous registrations are one of the unique ESN and the unique PIN.

15. The non-transitory computer readable medium of claim 13, further comprising code for receiving the request to register the device only if the device is connected wirelessly via the new subscriber's requesting mobile carrier's wireless network and can be identified by one of the unique ESN and the unique PIN.

* * * * *